(12) United States Patent
Cherian et al.

(10) Patent No.: US 10,051,521 B2
(45) Date of Patent: Aug. 14, 2018

(54) FAST ASSOCIATION AND ADDRESS CONTINUITY FOR HANDOFF BETWEEN UNMANAGED ACCESS POINTS

(71) Applicant: QUALCOMM Incorporated, San Diego, CA (US)

(72) Inventors: George Cherian, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/090,789

(22) Filed: Nov. 26, 2013

(65) Prior Publication Data
US 2014/0146787 A1    May 29, 2014

Related U.S. Application Data

(60) Provisional application No. 61/730,432, filed on Nov. 27, 2012.

(51) Int. Cl.
*H04W 36/00* (2009.01)
*H04W 12/06* (2009.01)
*H04W 84/12* (2009.01)

(52) U.S. Cl.
CPC ....... *H04W 36/0016* (2013.01); *H04W 12/06* (2013.01); *H04W 36/0066* (2013.01); *H04W 84/12* (2013.01)

(58) Field of Classification Search
CPC ......... H04W 76/064–76/066; H04W 36/0016; H04W 12/06
See application file for complete search history.

(56) References Cited

U.S. PATENT DOCUMENTS

2006/0187858 A1    8/2006  Kenichi et al.
2006/0281436 A1*  12/2006  Kim ..................... H04W 36/24
                                                         455/343.2
(Continued)

FOREIGN PATENT DOCUMENTS

CN    1606740 A    4/2005
CN    1969568 A    5/2007
(Continued)

OTHER PUBLICATIONS

International Search Report and Written Opinion—PCT/US2013/072134—ISA/EPO—dated Jul. 23, 2014.
(Continued)

*Primary Examiner* — Michael Thier
*Assistant Examiner* — Zhensheng Zhang
(74) *Attorney, Agent, or Firm* — Patterson & Sheridan, L.L.P.

(57) ABSTRACT

A method, an apparatus, and a computer program product for wireless communication are provided. The apparatus may comprise an interface configured to communicate data via a first device while an association is maintained with the first device and a processing system configured to perform pre-association operations, via the interface, to initiate association with a second device, while maintaining the association with the first device, and to decide to complete association with the second device and communicate data with the second device, based on a first one or more conditions.

13 Claims, 8 Drawing Sheets

(56) References Cited

U.S. PATENT DOCUMENTS

| | | | |
|---|---|---|---|
| 2007/0025294 A1* | 2/2007 | Kim | H04W 36/005 370/331 |
| 2007/0060105 A1 | 3/2007 | Batta | |
| 2007/0160008 A1 | 7/2007 | Burgess | |
| 2009/0285175 A1* | 11/2009 | Nix | H04L 29/125 370/331 |
| 2009/0285176 A1* | 11/2009 | Zheng et al. | 370/331 |
| 2009/0285178 A1 | 11/2009 | Chin et al. | |
| 2010/0304738 A1 | 12/2010 | Lim | |
| 2010/0311420 A1* | 12/2010 | Reza | H04W 36/0005 455/436 |
| 2013/0301569 A1* | 11/2013 | Wang et al. | 370/329 |

FOREIGN PATENT DOCUMENTS

| | | |
|---|---|---|
| CN | 101213866 A | 7/2008 |
| CN | 101828343 A | 9/2010 |
| CN | 101883312 A | 11/2010 |
| JP | H11239374 A | 8/1999 |
| JP | 2008514128 A | 5/2008 |
| JP | 2009118379 A | 5/2009 |
| JP | 2013110727 A | 6/2013 |
| TW | 201322790 A | 6/2013 |
| TW | 201401899 A | 1/2014 |
| WO | WO-2007138056 A1 | 12/2007 |

OTHER PUBLICATIONS

Parikh H., et al., "Seamless Handover of Mobile Terminal from WLAN to cdma2000 Network", World Wireless Congress, XX, XX, May 30, 2003 (May 30, 2003), pp. 1-6, XP002295002.
Taiwan Search Report—TW103112597—TIPO—dated Jan. 4, 2016.
Taiwan Search Report—TW105112034—TIPO—dated Apr. 6, 2017.
Taiwan Search Report—TW105112034—TIPO—dated Aug. 18, 2017.

* cited by examiner

FAST ASSOCIATION AND ADDRESS CONTINUITY FOR HANDOFF BETWEEN UNMANAGED ACCESS POINTS

CROSS-REFERENCE TO RELATED APPLICATIONS

The present patent application claims priority to U.S. Provisional Application No. 61/730,432, filed Nov. 27, 2012, assigned to the assignee of the present application and hereby expressly incorporated by reference in its entirety.

BACKGROUND

Field

The present disclosure relates generally to communication systems, and more particularly, to handoffs between access points in wireless networks.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include IEEE 802.11 (Wi-Fi), IEEE 802.16 (WiMAX), IEEE 802.20, code division multiple access (CDMA) systems, time division multiple access (TDMA) systems, frequency division multiple access (FDMA) systems, orthogonal frequency division multiple access (OFDMA) systems such as Flash-OFDMA, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. However, as the demand for mobile broadband access continues to increase, there exists a need for further improvements in the underlying technology. Preferably, these improvements should be applicable to various multi-access technologies and the telecommunication standards that employ these technologies.

For example, here is significant interest in systems and methods for offloading certain services delivered by cellular networks to Wi-Fi networks. However, certain issues are observable, including issues related to interruptions causes by handoffs between access points (APs). The Institute of Electrical and Electronic Engineers (IEEE) have promulgated certain standards, such as IEEE 802.11r, that introduce mechanisms for "fast handoff" across managed APs. However, these and other standards assume that there is a trust relationship across the APs involved in handoffs (e.g., APs managed by the same operator where association and corresponding authentication may not be necessary), however the APs used for cellular offload may not be in the same trusted network. Accordingly, the standards-based approaches cannot be used.

SUMMARY

According to certain aspects of the present disclosure, a method, a computer program product, and an apparatus are provided.

According to certain aspects of the present disclosure, the apparatus may include an interface configured to communicate data via a first device while an association is maintained with the first device and a processing system configured to perform pre-association operations, via the interface, to initiate association with a second device, while maintaining the association with the first device, and to decide to complete association with the second device and communicate data with the second device, based on a first one or more conditions.

According to certain aspects of the present disclosure, a computer program product may include a computer readable medium having instructions stored thereon for communicating data via a first device while an association is maintained with the first device, performing pre-association operations to initiate association with a second device, while maintaining the association with the first device, and deciding to complete association with the second device and communicate data with the second device, based on a first one or more conditions.

According to certain aspects of the present disclosure, the method may include communicating data via a first device while an association is maintained with the first device, performing pre-association operations to initiate association with a second device, while maintaining the association with the first device, and deciding to complete association with the second device and communicate data with the second device, based on a first one or more conditions.

According to certain aspects of the present disclosure, the apparatus may include means for communicating data via a first device while an association is maintained with the first device, means for performing pre-association operations to initiate association with a second device, while maintaining the association with the first device, and means for deciding to complete association with the second device and communicate data with the second device, based on a first one or more conditions.

According to certain aspects of the present disclosure, the apparatus may include at least one antenna, a transceiver configured to communicate, via the at least one antenna, data via a first device while an association is maintained with the first device and a processing system configured to perform pre-association operations, via the interface, to initiate association with a second device, while maintaining the association with the first device, and to decide to complete association with the second device and communicate data with the second device, based on a first one or more conditions.

In an aspect of the disclosure, the processing system is configured to maintain an association (e.g., a secondary association) with the first device after completing association (e.g., transferring a primary association to) the second device. The secondary association with the first device may be maintained for a period of time after the primary association is transferred from the first device to the second device. The secondary association may be maintained by establishing a context on the apparatus. The context may include one or more keys needed for data transmission and security. The processing system may be configured to determine whether to transfer the primary association from the second device to the first device during the period of time that the secondary association is maintained.

In an aspect of the disclosure, the data may be communicated only through one of the first and second devices with which the primary association is maintained. The processing system may associate with the second device by establishing context information corresponding to the second device.

In an aspect of the disclosure, establishing the context information includes authenticating the apparatus with the second device. Establishing the context information may include exchanging one or more encryption keys with the second device. Establishing the context information may include obtaining an Internet Protocol (IP) address assignment from the second device.

In an aspect of the disclosure, the processing system determines whether to transfer the primary association from the first device to the second device after establishing the context information corresponding to the second device. The processing system may be configured to maintain context information corresponding to the first device for a period of time after the primary association is transferred from the first device to the second device. The primary association is transferred when the association with the first device becomes a secondary association with the first device and the association with the second device becomes a primary association with the second device. The processing system may be configured to determine during the period of time whether to transfer the primary association from the second device to the first device based on the context information corresponding to the first device. The determination of whether to transfer the primary association from the first device to the second device may comprise determining connection quality between the apparatus and each of the first and second devices. The connection quality may be determined based on at least one of available bandwidth or a signal strength.

In an aspect of the disclosure, the processing system determines whether to transfer the primary association from the first device to the second device after selecting the second device from a plurality of candidate devices based on an IP subnet associated with the second device and an IP subnet used by the apparatus. The processing system may be configured to select the second device by preferring at least one of the plurality of candidate devices that is associated with the same IP subnet associated with the apparatus. The processing system may be further configured to refrain from performing a hand-off if no other device is associated with the IP subnet associated with the apparatus. The processing system may identify the subnet associated with the second device based on a random number uniquely associated with the subnet used by the apparatus.

In an aspect of the disclosure, the apparatus may comprise a processing system configured to determine one or more devices that provide wireless communications, and select one of the one or more devices for a hand-off based on an IP subnet associated with the selected device.

In an aspect of the disclosure, the processing system may be further configured to identify at least one subnet associated with each of the one or more devices. The processing system may select the one device for the hand-off based on an IP subnet associated with the apparatus. The processing system may select the one device for the hand-off by preferring at least one device that is associated with the same IP subnet associated with the apparatus. The at least one device may include a current device that provides wireless communications to the apparatus.

In an aspect of the disclosure, the processing system is further configured to refrain from performing a hand-off if the current device has a higher preference than any other device of the one or more devices. The processing system may be further configured to refrain from performing a hand-off if no other device is associated with the IP subnet associated with the apparatus.

In an aspect of the disclosure, the processing system identifies the at least one subnet based on a media access address of a gateway that provides access to IP services through the each device. The processing system may identify the at least one subnet based on a unique identifier of a gateway that provides access to IP services through the each device. The processing system may identify the at least one subnet based on a subnet identifier. The subnet identifier may comprise an IP address. The subnet identifier may comprise a random number uniquely associated with the each subnet. The random number may have been generated by one of the one or more devices.

In an aspect of the disclosure, the processing system is further configured to receive the random number in broadcast information. The processing system may be further configured to receive the subnet identifier in broadcast information. The subnet identifier may be encrypted in the broadcast information.

In an aspect of the disclosure, the processing system is further configured to decrypt the broadcast information to obtain the subnet identifier by using a key of a subnet associated with the apparatus. The key may comprise a key known by a plurality of devices. The key may comprise a group temporal key.

In an aspect of the disclosure, a hand-off is performed from a first device to the selected device. The first device and the selected device may be associated with different IP subnets. The processing system may be further configured to initiate a hand-off from the selected device to a third device after determining that the third device and the first device are associated with at least one common IP subnet.

In an aspect of the disclosure, the selected device is selected for the hand-off based on one or more factors. The factors may include a received signal strength indicator and a quality of channel. The processing system may be further configured to weight the one or more factors for each of the one or more devices based on an IP subnet associated with the each device.

BRIEF DESCRIPTION OF THE DRAWINGS

These and other sample aspects of the disclosure will be described in the detailed description and the appended claims that follow, and in the accompanying drawings, wherein:

Figure 1:
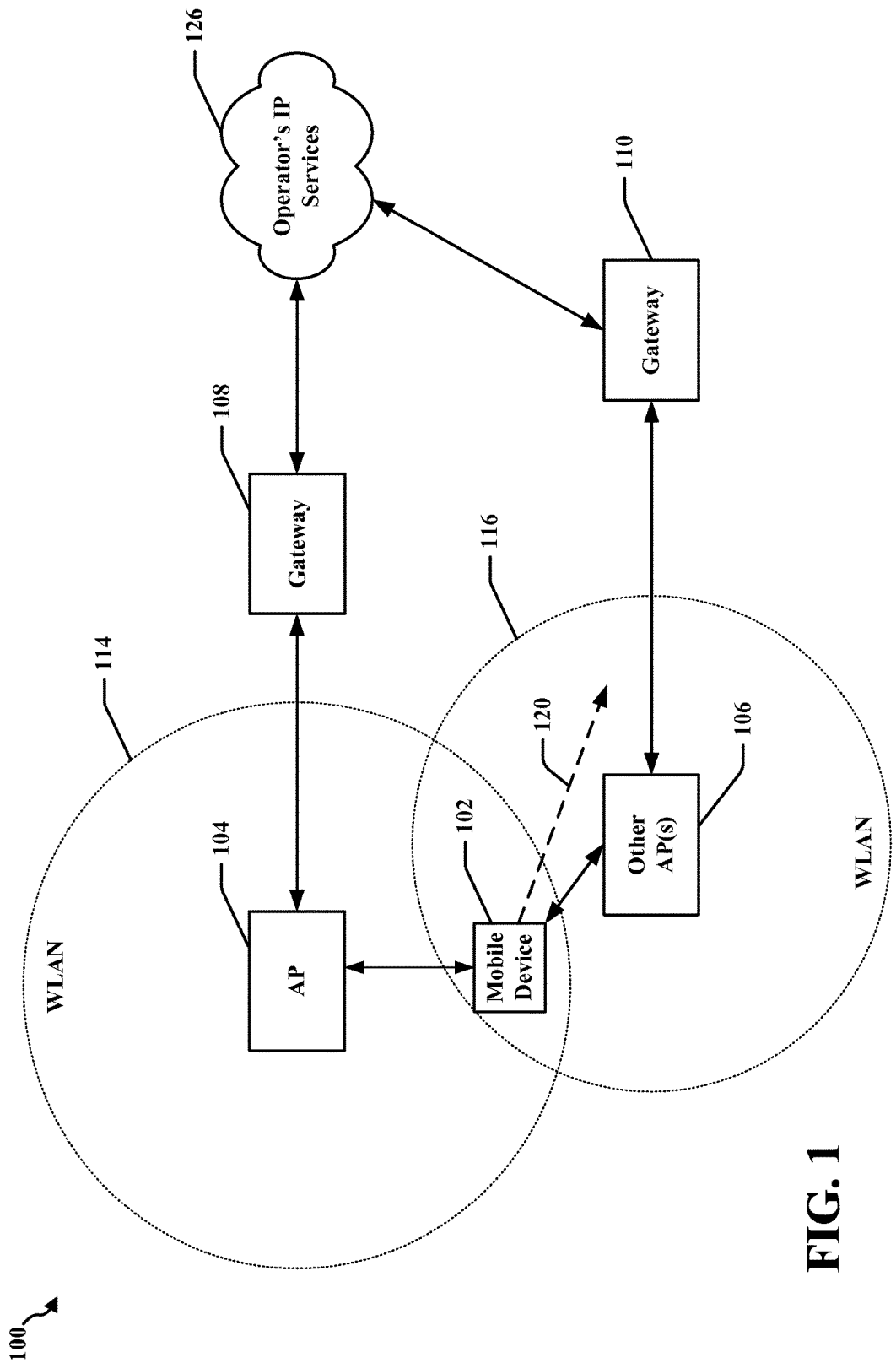
FIG. 1 is a diagram illustrating device handoff, in accordance with aspects of the present disclosure.

In accordance with common practice the various features illustrated in the drawings may be simplified for clarity. Thus, the drawings may not depict all of the components of a given apparatus (e.g., device) or method. In addition, like reference numerals may be used to denote like features throughout the specification and figures.

DETAILED DESCRIPTION

Aspects of the present disclosure provide techniques that may allow a wireless device (e.g., a station) to perform a fast association with a potential target access point (AP), while still maintaining an association with a source AP. For example, the wireless device may tune-away from the source AP and perform one or more "pre-association operations" with the target AP, such as authentication, key exchange and/or IP address assignment. As a result, if the wireless device ultimately decides to complete association with the source AP at a later time, with substantial time savings (e.g., on the order of seconds).

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communications systems, such as broadband wireless communication systems, including communication systems that are based on an orthogonal multiplexing scheme. Examples of such communication systems include Spatial Division Multiple Access (SDMA), TDMA, OFDMA systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point (AP) may comprise, be implemented as, or known as a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (AT) may comprise, be implemented as, or known as a subscriber station, a subscriber unit, a mobile device, a mobile station (MS), a remote station, a remote terminal, a user terminal (UT), a user agent, a user device, user equipment (UE), a user station, simply a station, or some other terminology. In some implementations, an access terminal may comprise a cellular telephone, a cordless telephone, a Session Initiation Protocol (SIP) phone, a wireless local loop (WLL) station, a personal digital assistant (PDA), a handheld device having wireless connection capability, a Station (STA), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 is a diagram illustrating an architecture of a wireless network 100. The wireless network 100 may include one or more mobile wireless devices 102, which may be referred to as a mobile station, user equipment, mobile computing device, station, etc. The wireless network architecture 100 may comprise one or more APs 104 and 106, which provide wireless communications in corresponding coverage areas 114 and 116, respectively. APs 104 and 106 may support WLAN services using one or more radio access technologies, wherein the services may include access to a wide area network, such as the Internet via an Operator's IP Services 126, via a gateway 108 and/or 110. Two or more APs 104 and 106 may be connected through the same or different gateways 108 or 110. Gateways 108 and 110 are typically assigned a subnet comprising a block of addresses, such as Internet Protocol (IP) addresses, which may be assigned for use with one or more mobile devices 102, APs 104, 106 and/or other equipment in a WLAN.

APs 104 and 106 may communicate with mobile device 102 using the same or different radio access technologies. APs 104 and 106 may be part of a wireless network 100 provided by a single operator, and access to the operator's IP Services 126 may be provided through the same or different gateways 108, 110. When the same gateway 108 or 110 provides service to both AP 104 and 106, then APs 104 and 106 may be part of the same subnet and mobile device 102 may maintain a same IP address when connected through either AP 104 or AP 106. When APs 104 and 106 provide connection to the Internet through different gateways 108 and 110, then the mobile device 102 may be assigned different IP addresses when connected to different APs 104 and 106. For example, wireless network 100 can include interconnected access networks provided by one or more operators, each operator providing access through different gateways 108 and 110.

As illustrated and described herein, the wireless network 100 provides packet-switched services, however, as those skilled in the art will readily appreciate, the various concepts presented throughout this disclosure may be extended to networks providing circuit-switched services. As illustrated and described herein, the mobile device 102 may comprise any user equipment such as a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The mobile device 102 may also be referred to by those skilled in the art as a mobile station, a subscriber station, a mobile unit, a subscriber unit, a wireless unit, a remote unit, user equipment, a wireless device, a wireless communications device, a remote device, a mobile subscriber station, an access terminal, a mobile terminal, a wireless terminal, a remote terminal, a handset, a user agent, a mobile client, a client, or some other suitable terminology. One or more of network entities 104, 106, 108, 110 may be connected through wireless or wired connections, which may be referred to as backhaul connections.

The modulation and multiple access scheme employed by the wireless network 100 may vary depending on the particular telecommunications standard being deployed and different modulation schemes may be used for uplink (UL) and downlink (DL) communication. According to certain aspects, OFDM is used on the DL and SC-FDMA is used on the UL to support both frequency division duplexing (FDD) and time division duplexing (TDD). As those skilled in the art will readily appreciate from the detailed description to follow, the various concepts presented herein may be readily extended to various telecommunication standards employing different modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The APs 104 and 106 may have multiple antennas enabling the APs 104 and 106 to exploit the spatial domain to support spatial multiplexing, beamforming, and transmit diversity. Spatial multiplexing may be used to transmit different streams of data simultaneously on the same frequency. The data steams may be transmitted to a single mobile device 102 to increase the data rate or to multiple mobile devices 102 to increase the overall system capacity. This may be achieved by spatially precoding each data stream (i.e., applying a scaling of an amplitude and a phase) and then transmitting each spatially precoded stream through multiple transmit antennas on the DL. The spatially precoded data streams arrive at the mobile device 102 with different spatial signatures, which enables each mobile device 102 to recover the one or more data streams destined for that mobile device 102. On the UL, each mobile device 102 may transmit a spatially precoded data stream, which enables the AP 104 and/or 106 to identify the source of each spatially precoded data stream.

In the example depicted in FIG. 1, mobile device 102 may be moving in a direction 120 from coverage area 114 into coverage area 116. Initially, mobile station may be connected to AP 104 and may be communicating data through AP 104 and gateway 108. Mobile station 102 may be able to detect signals from both APs 104 and 106 and may be able to receive service from both APs 104 and 106. At some point, mobile device 102 may be handed off from AP 104 to another AP 106 based on, for example, quality of service available from the APs 104 and 106. After handoff, the mobile station 102 may be assigned a different IP address, unless AP 104 and 106 belong to the same subnet (e.g. connected to IP services 126 through the same gateway 108 or 110).

Aspects of the present disclosure provide techniques that may allow the mobile station 102 to perform a fast association with a potential target AP (e.g., AP 106), by performing pre-association operations with the target AP while still maintaining an association with a source AP (e.g., AP 104). Performing pre-association with the target AP may help reduce delays when performing a full handoff from the source AP to the target AP.

Figure 2:
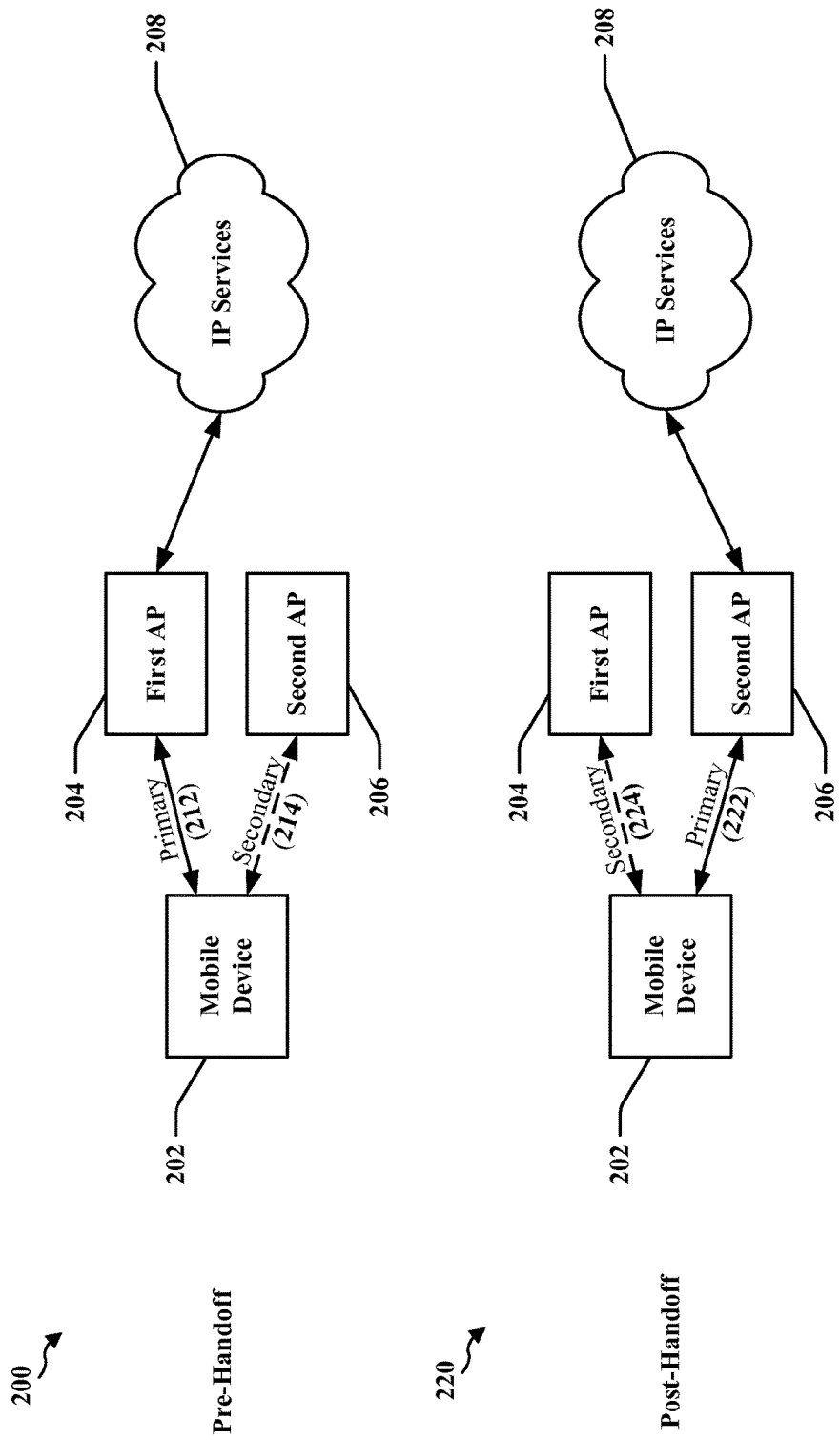
FIG. 2 is a diagram illustrating methods for fast association and address continuity for handoff between unmanaged access points, in accordance with aspects of the present disclosure.

FIG. 2 illustrates a handoff according to certain aspects of the invention. Certain aspects of the invention provide for more efficient handoff of a mobile device 202 between two access points 204 and 206 without significantly interrupting services 208 provided to the mobile device 202 through the access points 204 and 206. In one example, it may be desirable to hand off the mobile device between wireless local area network (WLAN) APs 204 and 206 that are not directly owned and operated by a single entity, and often may be owned or operated by an entity other than an operator of a home network of the mobile device 202. Typically, the operator may maintain backhaul connections to at least some of the WLAN APs 204 and 206 which are accessible to the mobile device 202.

According to certain aspects of the invention, one or more pre-associations may be established before handoff of mobile device 202. For example, the mobile device 202 may perform pre-assocation operations to initiate association with the second AP 206 while still maintaining association with the first AP 204 (and before completing handoff to the second AP 206). As depicted generally at 200, a mobile device 202 may be connected and receiving data and other services through a first AP 204, which may be connected to IP services 208 through first AP 204. The connection between mobile device 202 and first AP 204 may be referred to as a primary connection 212, when it is the sole conduit for carrying data between applications on the mobile device and one or more network entities or services 208. The mobile device 202 may associate with a second AP 206 when a handoff is anticipated. The mobile device 202 may establish a secondary connection 214 with the second AP 206 in what may be referred to as a "pre-association" with the second AP 206. Data continues to be communicated only through the primary connection 212 until a full handoff is completed. In this scenario 200, first AP 204 may be known as a source AP and second AP 206 may be referred to as a target AP.

The mobile device 202 may associate with the second AP 206 by performing one or more of an authentication process, a 4-way handshake for key exchange, and the mobile device 202 may be assigned an IP address for use when connected to the second AP 206. If the first and second APs 204 and 206 employ the services of a same gateway 108 or 110 (see FIG. 1), then the IP address assignment may be unchanged between APs 204 and 206. According to certain aspects, an association frame maybe communicated between AP 206 and mobile device 202 that includes a field indicating that "pre-association" has been established. This may allow an AP to determine when a mobile device is performing "pre-association" operations and does not intend to complete association immediately. In other words, the mobile device may continue to use the services provided through the primary connection 212 until a full handoff to second AP 206 is desired (e.g., as triggered by handoff conditions based on receive signals strength from AP 206 and/or AP 204).

A full handoff to second AP 206 may be desirable when the mobile device detects that the target AP 206 offers a better connection than the current or source AP 204. The mobile device 202 may then tune to target AP 206 and send a frame indicating handoff completion to the AP 206. The indication may be a NULL data frame, an existing management frame, or a newly defined type of management frame that requires acknowledgement. Upon receiving the indication of handoff completion from the mobile device 202, the target AP 206 may complete the association procedure and admit the mobile device into the network.

Upon completion of the association procedure, a post-handoff scenario 220 is entered in which the second AP 206 provides the primary connection 222 between mobile device 202 and network services 208. Data communication between network services 208 and mobile device 202 through AP 204 is terminated. However, the mobile device 202 may maintain its association with AP 204 and through a newly-designated secondary connection 224. According to certain aspects, the first AP 204 may maintain or otherwise hold the association for a predefined duration of time. This duration of time may be communicated to the mobile device, for example, during initial association or by transmission of a management frame subsequent to the association.

The mobile device 202 may elect to revert to the first AP 204 for receiving services, and the mobile device may send an indication of "handoff completion" to the first AP 204 to cause the status of the primary and secondary connections to be switched. According to certain aspects, delays and interruptions of in the connection between mobile device 202 and network services 208 may be avoided or significantly reduced by performing the pre-association procedure described herein. For example, the association and IP address assignment can take 4 or more seconds, which, in some cases, may be cause termination of connection between applications on mobile device 202 and the network services 208 during a conventional handoff.

Referring again to FIG. 1, during the handoff between APs 104 and 106, the IP address assigned to mobile device 102 may change if the APs 104 and 106 are not connected to the same subnet. In conventional systems, there is typically no clear indication to the mobile device whether or not APs 104 and 106 operate in the same network domain and, after handover the mobile device 102 would conventionally send a dynamic host configuration protocol (DHCP) message to request or renew the IP address. The DHCP message may be received and processed by a DHCP service that is provided in gateway 108 or 110, or by a separate DHCP server (not shown). When target AP 106 belongs to the same subnet as the source AP 104, a DHCP server may provide the same IP address to the mobile device 102. However, executing a DHCP and IP address assignment procedure typically occurs after authentication and association and can result in a very time-consuming handoff that may introduce a 2-3 second delay or interruption of service, affecting applications executed by the mobile device 102.

According to certain aspects, a mobile device 102 may base selection of APs 104, 106 for handoff on subnet membership of the APs 104 and 106. The mobile device 102 may be located in an area where multiple APs 104, 106 are accessible to the mobile device 102. When a handoff is required, mobile device 102 may select a target AP 106 from among the APs 104, 106 based on whether the target AP 106 belongs to the same subnet as source AP 104.

Certain aspects permit the mobile device 102 to identify a same-subnet target AP 106 without disruption of services to the mobile device 102. The mobile device 102 may select a target AP 106 based on signaling transmitted by the APs 104 and 106 that includes information identifying subnet membership of the APs 104, 106.

According to certain aspects, APs 104 or 106 connected to the same subnet may be assigned a random number, which the APs 104, 106 transmit to the mobile device 102. The random number may be generated for a subnet by an AP 104 or 106 that first powers up and connects to a gateway 108 or 110 corresponding to the subnet. The AP 104 or 106 may send a multicast packet targeting other APS 104 or 106 to determine whether a random number has been allocated for the subnet. If no reply is forthcoming, the AP 104 or 106 may allocate a random number for the subnet. The AP 104 or 106 may then periodically broadcast the random number to other APs 104 or 106 and/or to mobile devices 102 in a multicast packet. The multicast packet may be sent wirelessly, and/or through a backhaul connection. Multicast messaging may conform to a configuration standard such as multicast domain name system (MDNS), Bonjour, universal plug and play (UPnP), etc.

According to certain aspects, an AP 104, 106 that is powered up on the subnet may listen for multicast message frames containing the random number on a backhaul and/or Ethernet connection. If no multicast messages are received within a predefined or preconfigured time period, the AP 104, 106 may generate a random number. The AP 104 or 106 may then periodically transmit the random number such that other APs 104 or 106 connecting to the same subnet may be synchronized with the random number selection used to identify the subnet. The multicast packet may be sent wirelessly, and/or through a backhaul connection. Multicast messaging may conform to a configuration standard such as MDNS, Bonjour, UPnP, etc.

According to certain aspects, an AP 104, 106 may transmit information to a mobile device 102 that identifies all subnets to which the AP 104, 106 is connected. The information may include a subnet address.

Subnet identification information may be transmitted to the mobile device 102 as broadcast in, for example, a beacon, a probe-request/response, etc. According to certain aspects, the subnet identification may be provided using an access network query protocol (ANQP) and/or a generic advertisement service (GAS).

A mobile device 102 may select a device for handoff by comparing the random number, subnet address or other subnet identifier obtained from a source AP 104 in a current subnet, with corresponding information received from a target AP 106. The mobile device 102 may make a determination whether to associate with the target AP 106 based on the subnet identifier. In one example, mobile device 102 may apply a lower threshold for performing handoff when the target AP 106 is in the same subnet as the source AP 104. According to certain aspects, the mobile device 102 may adjust thresholds for APs 104, 106 according to their corresponding subnet membership and such that the mobile device 102 is less likely to perform the handoff when the source AP 104 and the target AP 106 are in different subnets. Accordingly, the mobile device 102 may remain connected to the source AP 104 for a longer period of time.

According to certain aspects, a target AP 104, 106 may be selected from a plurality of suitable candidates based on the subnet membership, even where superior connection quality is available from other candidate APs 104, 106, where the quality of the connection may be measurable in terms of bandwidth and/or signal strength, for example. Stronger signals may be offer greater channel quality due to better signal-to-noise ratios and the greater channel quality may offer increased bandwidths.

According to certain aspects, mobile device 102 may cache IP context and the associated random number for APs 104 and 106, so that even though mobile device 102 is handed-off to a target AP 104 or 106 that requires assignment of a different IP address, the mobile device 102 may identify a different AP at a later point in time that belongs to the subnet of the source AP 104 or 106.

According to certain aspects, when AP 104 or 106 broadcasts subnet identifiers, some or all of the payload of the broadcast message may be encrypted. Encryption may be accomplished using a group temporal key (GTK) and/or an integrity GTK (IGTK) to encrypt the subnet identifier. The mobile device 102 may use a GTK/IGTK obtained while connected to a source AP 104 to decrypt subnet identifier fields received from a target AP 106.

According to certain aspects, all APs 104, 106 belonging to a common subnet use the same GTK/IGTK at any point of time. Re-keying may be performed by all the APs 104, 106 simultaneously.

According to certain aspects, source AP 104, when advertising neighbor information, can include the subnet identifier field of neighboring APs 106. Additional information may be provided to the mobile device 102, including authentication domain etc.

Figure 3:
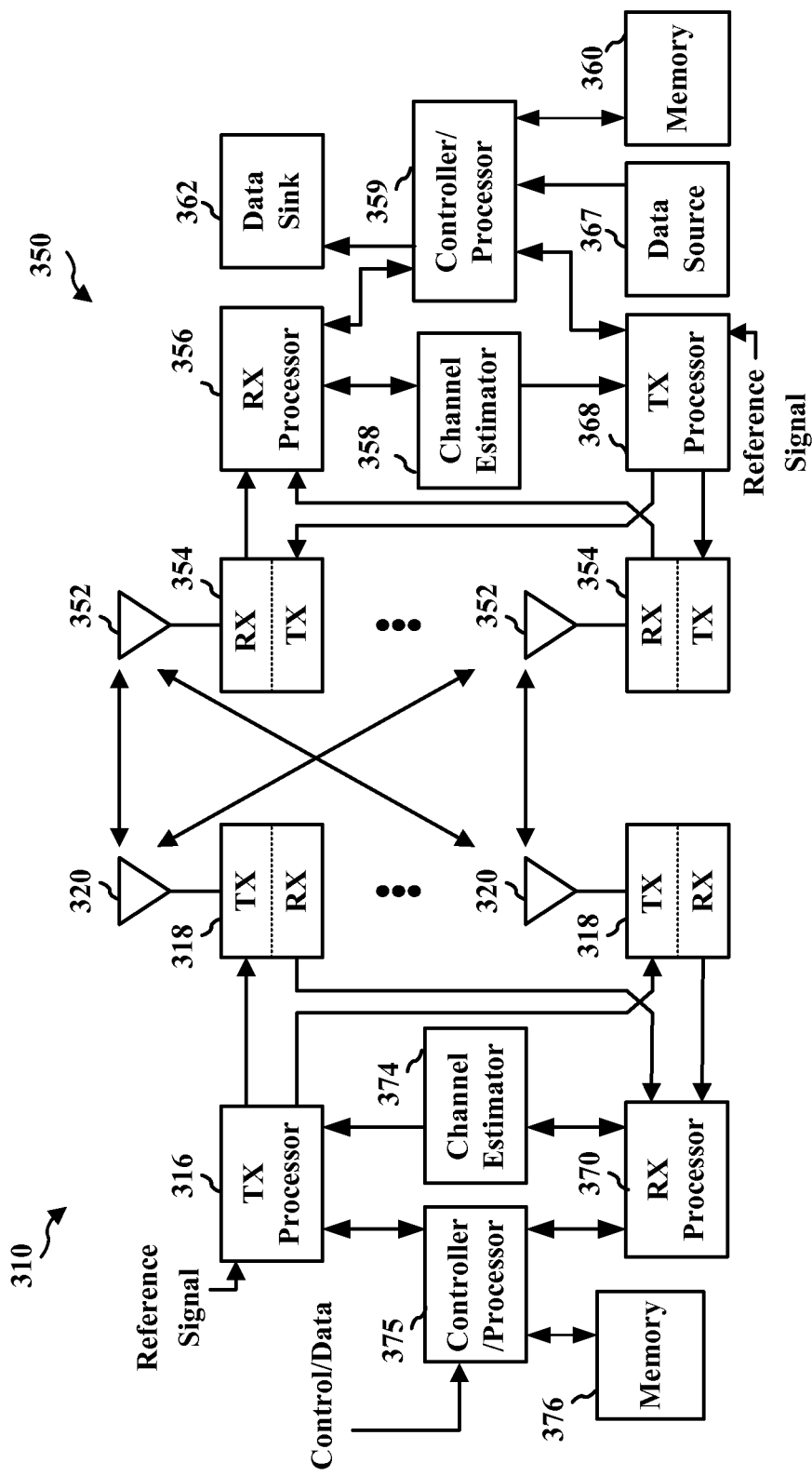
FIG. 3 is a block diagram of an access point in communication with a mobile device, in accordance with aspects of the present disclosure.

FIG. 3 is a block diagram of an example AP 310 in communication with a mobile device 350 in an access network. The AP 310 may, for example, correspond to AP 104/106 shown in FIG. 1 or AP 204/206 shown in FIG. 2, while mobile device 350 may correspond to mobile device 102 shown in FIG. 1 or mobile device 202 shown in FIG. 2.

In the DL, upper layer protocol packets from a core network are provided to a controller/processor 375. In the DL, the controller/processor 375 provides header compression, ciphering, packet segmentation and reordering, multiplexing between logical and transport channels, and radio resource allocations to the mobile device 350 based on various priority metrics. The controller/processor 375 may also be responsible for retransmission of lost packets, and signaling to the mobile device 350.

The transmit (TX) processor 316 implements various signal processing functions for the physical layer. For example, the signal processing functions may include coding and interleaving to facilitate forward error correction (FEC) at the mobile device 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams and each stream may be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. Channel estimates may include channel gain estimates, SNR estimates, noise variance and so on, that may be used to determine quality of a channel. The channel estimate may be derived from a reference signal and/or channel condition feedback transmitted by the mobile device 350. Each spatial stream may be provided to a different antenna 320 via a separate transmitter 318TX. Each transmitter 318TX modulates an RF carrier with a respective spatial stream for transmission.

At the mobile device 350, each receiver 354RX receives a signal through its respective antenna 352. Each receiver 354RX recovers information modulated onto an RF carrier and provides the information to the receive (RX) processor 356. The RX processor 356 performs spatial processing on the information to recover any spatial streams destined for the mobile device 350. If multiple spatial streams are destined for the mobile device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the AP 310. These soft decisions may be based on channel estimates computed by the channel estimator 358. The soft decisions are then decoded and deinterleaved to recover the data and control signals that were originally transmitted by the AP 310 on the physical channel. The data and control signals are then provided to the controller/processor 359.

The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. Upper layer packets are then provided to a data sink 362, which represents multiple protocol layers. Various control signals may also be provided to the data sink 362 for processing. The controller/processor 359 may also be responsible for error detection using an acknowledgement (ACK) and/or negative acknowledgement (NACK) protocol.

In the UL, a data source 367 is used to provide upper layer packets to the controller/processor 359. The data source 367 represents multiple protocol layers. Similar to the functionality described in connection with the DL transmission by the AP 310, the controller/processor 359 may implement multiple protocol functions by providing header compression, ciphering, packet segmentation and reordering, and multiplexing between logical and transport channels based on radio resource allocations by the AP 310. The controller/processor 359 may also be responsible for retransmission of lost packets, and signaling to the AP 310.

Channel estimates derived by a channel estimator 358 from a reference signal or feedback transmitted by the AP 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the AP 310 in a manner similar to that described in connection with the receiver function at the mobile device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the mobile device 350. Upper layer packets from the controller/processor 375 may be provided to the core network. The controller/processor 375 may also be responsible for error detection using an ACK and/or NACK protocol.

Figure 4:
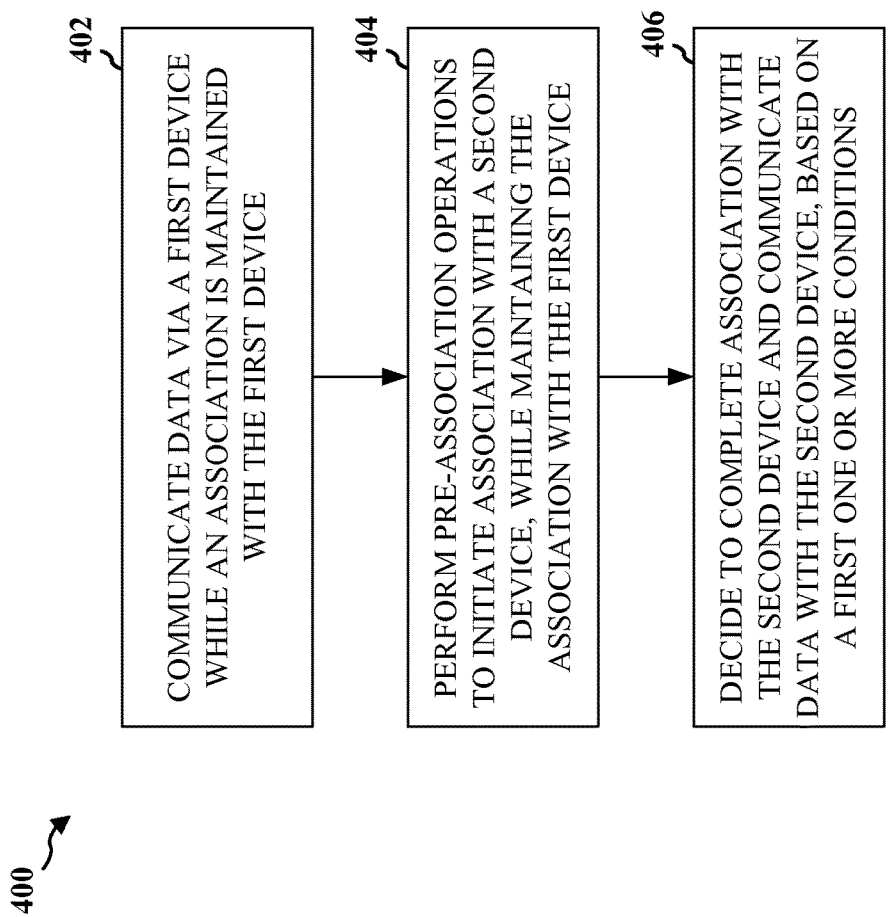
FIG. 4 illustrates example operations for wireless communication, in accordance with aspects of the present disclosure.

FIG. 4 illustrates example operations 400 for wireless communication, in accordance with aspects of the present disclosure. The operations 400 may be performed, for example, by mobile device 102, 202, or 350 shown in FIGS. 1-3.

The operations 400 begin, at 402, by communicating data via a first device (e.g., a source AP) while an association is maintained with the first device. At 404, the mobile device may perform pre-association operations to initiate association with a second device (e.g., a target AP), while maintaining the association with the first device. At 406, the mobile device may decide to complete association with the second device and communicate data with the second device, based on a first one or more conditions.

In some cases, the first one or more conditions may comprise handoff trigger conditions. As an example, a handoff trigger condition may be met if receive signal quality (e.g., as measured by a received reference signal) is greater via the second device than the first device and/or if the receive signal quality via the first device has fallen below a threshold value. In some cases, whether to perform pre-association with a new AP may be based on similar type conditions (e.g., but with thresholds set such that pre-association is triggered before an actual handoff).

Figure 5:
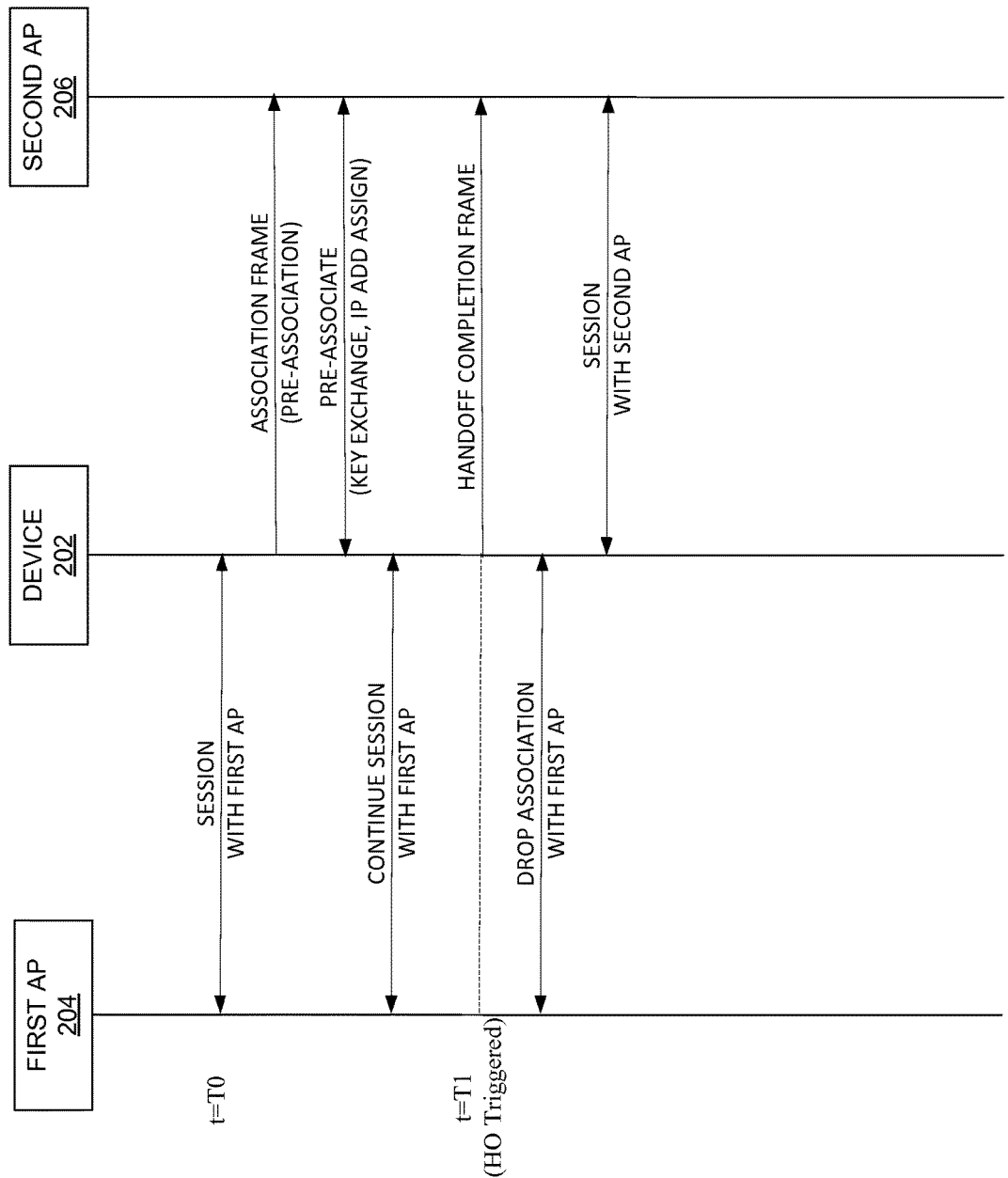
FIG. 5 illustrates an example call flow diagram for fast association, in accordance with aspects of the present disclosure.

FIG. 5 illustrates an example call flow diagram for fast association, in accordance with aspects of the present disclosure. For illustrative purposes, the call flow diagram uses the mobile device 202 and first and second APs 204 and 206 of FIG. 2.

As illustrated, at time T0, the mobile device 202 may have an association with the first AP 204 (e.g., a source AP) during a data session. As illustrated, the mobile device 202 may tune away from the first AP 204 and perform pre-association operations with the second AP 206 (e.g., a target AP).

As described above, the mobile device may first signal an intent for pre-association via a frame (e.g., NULL data frame or management frame) with a field indicating "pre-association." After pre-association with the second AP 206, the mobile device 202 may continue the session with the first AP 204.

At a later time (T1), however, a handoff may be triggered (e.g., via better receive signal strength or other quality parameter indicating better service may be had at the second AP 206). Thus, the mobile device may complete handoff to the second AP (e.g., by sending a frame indicating handoff complete). Because of the pre-association operations previously performed, the mobile device may be able to begin a session with the second AP 206 with little delay.

According to certain aspects, the first AP 204 may drop association with the mobile device 202 after it hands off to the second AP 206. As noted above, however, in some cases, association of the mobile device 202 with the first AP may be maintained for a time period, allowing the mobile device 202 to resume the session with the first AP (without having to perform association again).

Figure 6A:
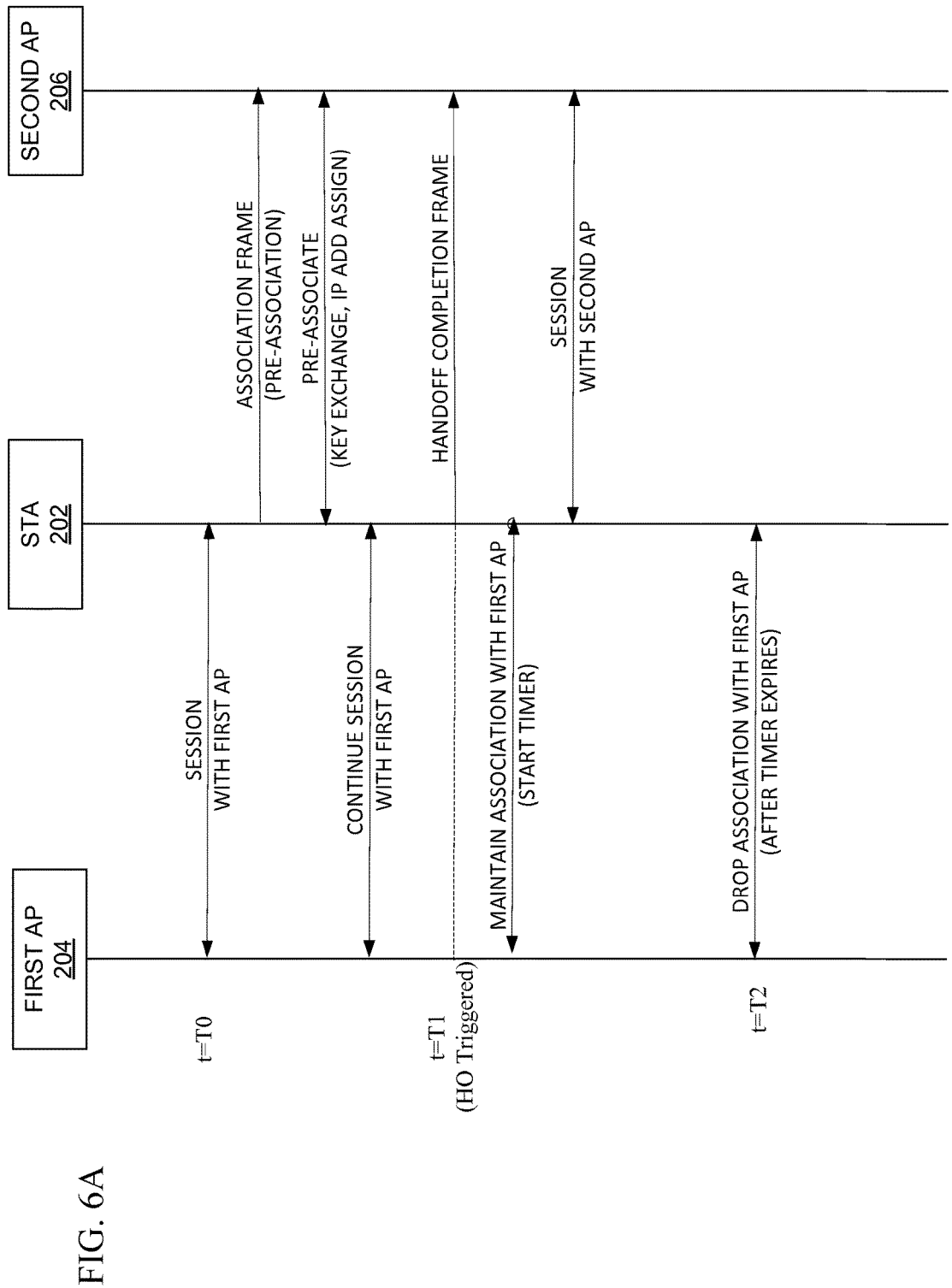
FIGS. 6A and 6B illustrate example call flow diagrams for fast association in which an association is maintained at a source AP, in accordance with aspects of the present disclosure.
Figure 6B:
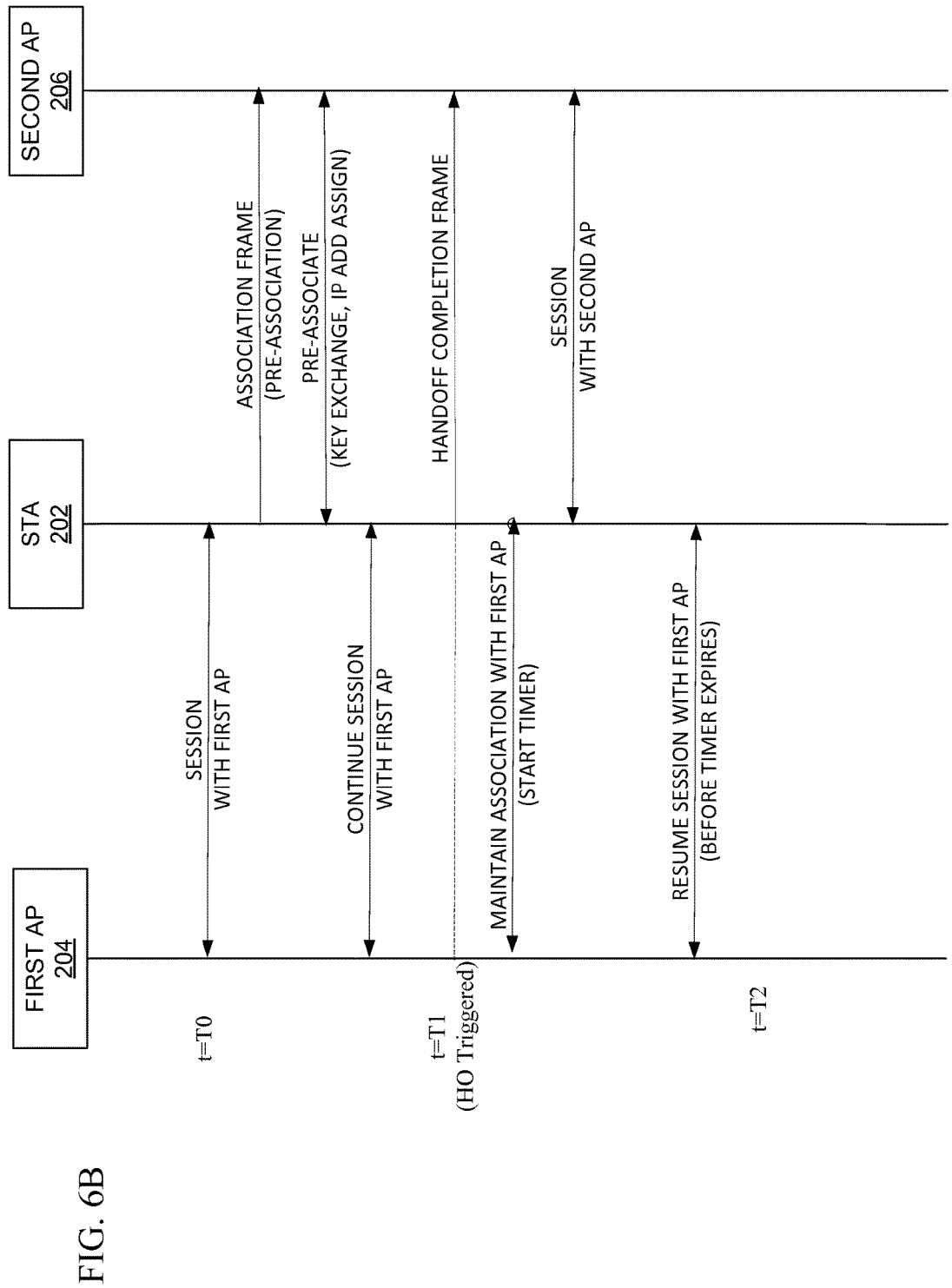

FIGS. 6A and 6B illustrate example call flow diagrams for fast association in which an association is maintained at a source AP, in accordance with aspects of the present disclosure. Up to time T1, the call flow diagrams are the same as in FIG. 5. However, after the handoff is triggered at T1, the association between mobile device 202 and the first AP 204 is maintained for a time duration. As noted above, the time duration may be indicated, for example, during initial association with the first AP.

As illustrated in FIG. 6A, if the mobile device 202 does not return to the first AP 204 within the time period, which expires at T2 in the illustrated example, the association between the first AP 204 and the mobile device 202 is dropped.

On the other hand, as illustrated in FIG. 6B, if the mobile device 202 decides to return to the first AP 204 within the time period, the mobile device 202 may resume the session with the first AP 204 without again having to perform association. As noted above, the mobile device 202 may indicate it is resuming operations with the first AP 204 by sending a handoff complete message to the first AP 204.

According to certain aspects, determining whether to transfer the primary association 212 from the first device 202 to the second device 204 includes determining a quality of connection with each of the first and second devices 202, 204. The connection quality may be determined based on at least one of available bandwidth or a signal strength. Determining whether to transfer the primary association 212 from the first device 202 to the second device 204 includes selecting the second device 204 from a plurality of candidate devices based on an IP subnet associated with the second device 204 and a current IP subnet associated with the first device 202. Selecting the second device 204 may include preferring at least one of the plurality of candidate devices that is associated with the current IP subnet. The method may comprise refraining from performing a hand-off if no other device is associated with the current IP subnet. The method may comprise identifying the subnet associated with the second device based on a random number uniquely associated with the current IP subnet.

The device selected for the hand-off may be selected by preferring at least one device that is associated with the current IP subnet. The at least one device includes a current device 204 that provides wireless communications to an apparatus 202 performing the method. The method may comprise refraining from performing a hand-off if the current device 204 has a higher preference than any other device of the one or more devices. The method may comprise refraining from performing a hand-off if no other device is associated with the IP subnet associated with the method.

According to certain aspects, at least one subnet is identified based on a media access address of a gateway 108, 110 (see FIG. 1) that provides access to IP services through the each device. The at least one subnet may be identified based on a unique identifier of a gateway 108, 110 that provides access to IP services through the each device. The at least one subnet may be based on a subnet identifier. The subnet identifier may comprise an IP address. The subnet identifier may comprise a random number uniquely associated with the each subnet. The random number may be generated by one of the one or more devices.

According to certain aspects, the random number may be received in broadcast information. The subnet identifier maybe received in broadcast information. The subnet identifier may be encrypted in the broadcast information and the method may comprise decrypting the broadcast information to obtain the subnet identifier by using a key of the current IP subnet. The key may comprise a key known by a plurality of devices. The key may comprise a group temporal key. The method may comprise performing a hand-off from a first device 204 to the selected device 206, for example. The first device 204 and the selected device 206 may be associated with different IP subnets.

According to certain aspects, a hand-off from the selected device to a third device may be initiated subsequent to performing the handoff from the first devices to the selected device, and after determining that the third device and the first device are associated with at least one common IP subnet.

Figure 7:
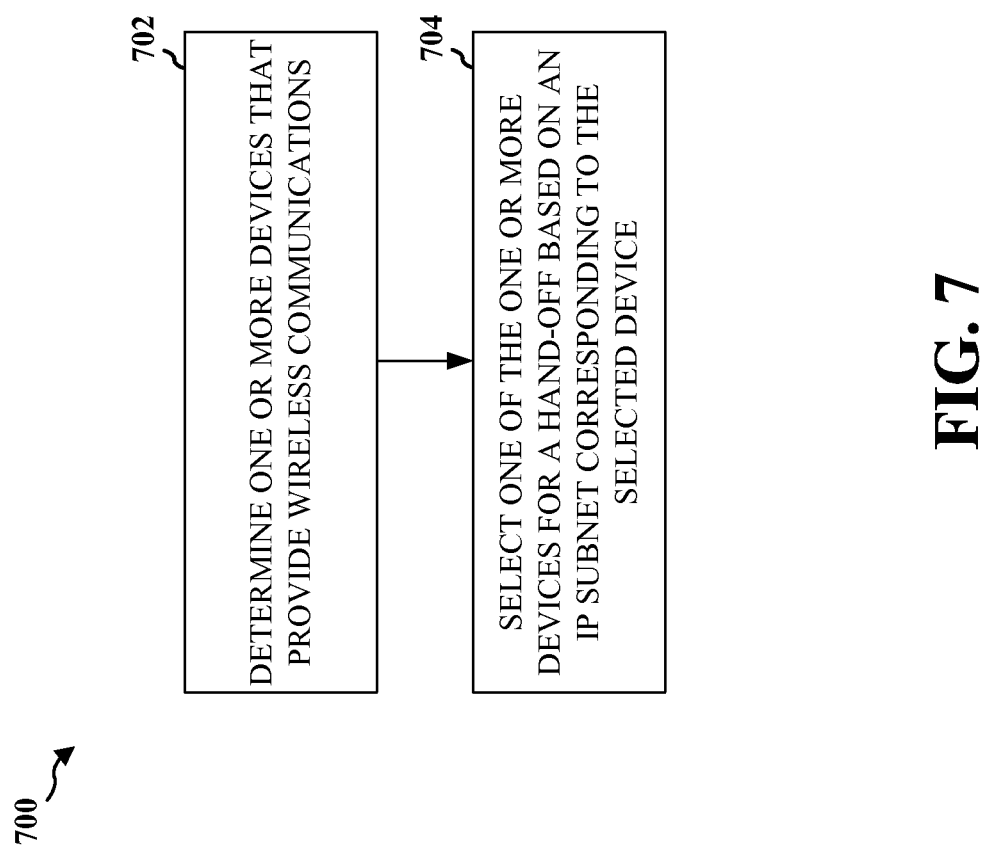
FIG. 7 illustrates example operations for wireless communication, in accordance with aspects of the present disclosure.

FIG. 7 illustrates example operations 700 for wireless communication in accordance with aspects of the present disclosure. The operations may be performed, for example, by mobile device 202. At 702 the mobile device 202 may determine one or more devices 204, 206 that provide wireless communications.

At 704, the mobile device 202 may select one of the one or more devices 204, 206 for a hand-off based on an IP subnet corresponding to the selected device. The mobile device 202 may identify at least one subnet corresponding to each of the one or more devices 204, 206. The mobile device 202 may select the selected device based on an IP subnet corresponding to the mobile device 202.

According to certain aspects, the mobile device 202 may associate with the selected device 204 or 206. The at least one subnet corresponding to each of the one or more devices may be identified prior to associating with the selected device 204 or 206. The mobile device 202 may select the selected device 204 or 206 by preferring at least one device 204, 206 that is associated with the same IP subnet corresponding to the mobile device 202.

According to certain aspects, the at least one device 204, 206 includes a current device 204 or 206 that provides wireless communications to the mobile device 202. The mobile device 202 may refrain from performing a hand-off if the current device 204 or 206 has a higher preference than any other of the one or more devices 204, 206.

According to certain aspects, the mobile device 202 may refrain from performing a hand-off if no other device 204, 206 is associated with the IP subnet corresponding to the mobile device 202. The mobile device 202 may identify the at least one subnet based on a media access address of a gateway that provides access to IP services through the each device 204, 206. According to certain aspects, the mobile device 202 identifies the at least one subnet based on a unique identifier of a gateway that provides access to IP services through the each device. The mobile device 202 may identify the at least one subnet based on a subnet identifier. The subnet identifier may comprise an IP address. The subnet identifier may comprise a random number uniquely corresponding to the each subnet. The random number may have been generated by one of the one or more devices 204, 206. The mobile device 202 may receive the random number in broadcast information. The mobile device 202 may receive the subnet identifier in broadcast information. The subnet identifier may be encrypted in the broadcast information. The mobile device 202 may decrypt the broadcast information to obtain the subnet identifier by using a key of a subnet corresponding to the apparatus. The key may comprise a key known by a plurality of devices. The key may comprise a group temporal key. The mobile device 202 may be configured to initiate a hand-off from a first device to the selected device 204 or 206. The first device and the selected device 206 or 204 are associated with different IP subnets. The mobile device 202 may initiate a hand-off from the selected device to a third device after determining that the third device and the first device are associated with at least one common IP subnet.

According to certain aspects, the mobile device 202 may select based on one or more factors, and the factors may include a received signal strength indicator and a quality of channel. The mobile device 202 may weight the one or more factors for each of the one or more devices based on an IP subnet corresponding to the each device.

In certain aspects, a processing system that performs certain steps of the method illustrated in FIGS. 4 and 7 may be a component of the mobile device 350 and may include the memory 360 and/or at least one of the TX processor 368, the RX processor 356, and the controller/processor 359. In one configuration, an apparatus for wireless communication includes means for communicating data via a first device while a primary association is maintained with the first device, means for associating with a second device while maintaining the primary association with the first device, means for determining whether to transfer the primary association from the first device to the second device, means for determining one or more devices that provide wireless communications, and means for selecting one of the one or more devices for a hand-off based on an IP subnet associated with the selected device. As noted supra, a processing system may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

According to certain aspects, such means may be implemented by processing systems configured to perform the corresponding functions by implementing various algorithms (e.g., in hardware or by executing software instructions) described above for performing fast association.

The various aspects of a mobile device receiver described thus far may be integrated into a variety of devices, including by way of example, a wireless device. A wireless device may include various components that perform functions based on signals (e.g., comprising information such as data) that are transmitted by or received at the wireless device. For example, a wireless headset may include a transducer configured to provide an audio output to a user. A wireless watch may include a user interface configured to provide an indication to a user. A wireless sensing device may include a sensor configured to provide an audio output to a user or configured to provide audio to be transmitted via the transmitter.

A wireless device may communicate via one or more wireless communication links that are based on or otherwise support any suitable wireless communication technology. For example, according to certain aspects a wireless device may associate with a network. According to certain aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. According to certain aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

According to certain aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

The components described herein may be implemented in a variety of ways. For example, an apparatus may be represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof. Such an apparatus may include one or more modules that may perform one or more of the functions described above with regard to various figures.

As noted above, according to certain aspects these components may be implemented via appropriate processor components. These processor components may be implemented, at least in part, using structure as taught herein. According to certain aspects a processor may be adapted to implement a portion or all of the functionality of one or more of these components.

As noted above, an apparatus may comprise one or more integrated circuits. For example, a single integrated circuit may implement the functionality of one or more of the illustrated components, while in other aspects more than one integrated circuit may implement the functionality of one or more of the illustrated components.

In addition, the components and functions described herein may be implemented using any suitable means. Such means also may be implemented, at least in part, using corresponding structure as taught herein. For example, the components described above may be implemented in an "ASIC" and also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
a transceiver configured to communicate data via a first device while an association is maintained with the first device; and
a processing system configured to:
perform pre-association operations, via the transceiver, to initiate association with a second device while maintaining the association with the first device;
decide whether to complete association with the second device based on one or more conditions;
complete the association with the second device if the decision is to complete the association with the second device;
maintain the association with the first device for a period of time after completing the association with the second device, wherein completing the association with the second device comprises transmitting, via the transceiver, a frame indicating a completion of a handoff of the apparatus from the first device to the second device; and
resume communicating data with the first device, after completing the association with the second device, within the period of time if the association with the second device is not found suitable, wherein the processing system is configured to resume communicating with the first device by generating a frame indicating a completion of a handoff of the apparatus from the first device to the second device, and wherein the transceiver is configured to transmit the generated frame to the first device.

2. The apparatus of claim 1, wherein the pre-association operations comprise at least one of: authentication, key exchange, or internet protocol (IP) address assignment with the second device.

3. The apparatus of claim 1, wherein the pre-association operations comprise transmitting, via the transceiver, an association frame with a field indicating pre-association.

4. The apparatus of claim 1, wherein the frame comprises at least one of a NULL data frame or a management frame that solicits an acknowledgement.

5. The apparatus of claim 1, wherein the one or more conditions comprise handoff trigger conditions.

6. The apparatus of claim 5, wherein the handoff trigger conditions comprise at least one threshold for performing a handoff from the first device to the second device, and wherein the processing system is configured to decide whether to complete association with the second device by adjusting the least one threshold based on an IP subnet of the first device and an IP subnet of the second device.

7. A method for wireless communication by an apparatus, comprising:
   communicating data via a first device while an association is maintained with the first device;
   performing pre-association operations to initiate association with a second device, while maintaining the association with the first device;
   deciding whether to complete association with the second device based on one or more conditions;
   completing the association with the second device if the decision is to complete the association with the second device;
   maintaining the association with the first device for a period of time after completing the association with the second device, wherein completing the association with the second device comprises transmitting a frame indicating a completion of a handoff of the apparatus from the first device to the second device; and
   resuming communicating data with the first device, after completing the association with the second device, within the period of time if the association with the second device is not found suitable, wherein resuming communicating data with the first device comprises transmitting a frame to the first device indicating a completion of a handoff of the apparatus from the first device to the second device.

8. The method of claim 7, wherein the pre-association operations comprise at least one of: authentication, key exchange, or internet protocol (IP) address assignment with the second device.

9. The method of claim 7, wherein the pre-association operations comprise transmitting an association frame with a field indicating pre-association.

10. The method of claim 7, wherein the frame comprises at least one of a NULL data frame or a management frame that solicits an acknowledgement.

11. The method of claim 7, wherein the one or more conditions comprise handoff trigger conditions.

12. The method of claim 11, wherein the handoff trigger conditions comprise at least one threshold for performing a handoff from the first device to the second device, and wherein deciding whether to complete association with the second device comprises adjusting the least one threshold based on an IP subnet of the first device and an IP subnet of the second device.

13. A wireless station, comprising:
   at least one antenna;
   a transceiver configured to communicate, via the at least one antenna, data via a first device while an association is maintained with the first device; and
   a processing system configured to:
      perform pre-association operations, via the transceiver, to initiate association with a second device, while maintaining the association with the first device;
      decide whether to complete association with the second device based on one or more conditions;
      complete the association with the second device if the decision is to complete the association with the second device;
      maintain the association with the first device for a period of time after completing the association with the second device, wherein completing the association with the second device comprises transmitting, via the transceiver, a frame indicating a completion of a handoff of the wireless station from the first device to the second device; and
      resume communicating data with the first device, after completing the association with the second device, within the period of time if the association with the second device is not found suitable, wherein the processing system is configured to resume communicating with the first device by generating a frame indicating a completion of a handoff of the apparatus from the first device to the second device, and wherein the transceiver is configured to transmit, via the at least one antenna, the generated frame to the first device.

* * * * *